United States Patent
Swain

(10) Patent No.: US 8,118,999 B2
(45) Date of Patent: Feb. 21, 2012

(54) SWIRLING AIR INJECTED POOL FILTER

(76) Inventor: Jeffrey Swain, Tallahassee, FL (US)

(*) Notice: Subject to any disclaimer, the term of this patent is extended or adjusted under 35 U.S.C. 154(b) by 576 days.

(21) Appl. No.: 12/284,819

(22) Filed: Sep. 25, 2008

(65) Prior Publication Data

US 2010/0072117 A1 Mar. 25, 2010

(51) Int. Cl.
*B01D 17/12* (2006.01)
*B01D 24/46* (2006.01)
*B01D 33/50* (2006.01)

(52) U.S. Cl. ............... 210/136; 210/167.13; 210/167.14; 210/221.2; 210/275; 210/279

(58) Field of Classification Search .................. 210/108, 210/117, 136, 137, 167.11, 167.12, 167.13, 210/167.14, 275–279, 411, 416.1, 416.2, 210/220, 221.2, 291
See application file for complete search history.

(56) References Cited

U.S. PATENT DOCUMENTS

| | | | | |
|---|---|---|---|---|
| 1,405,406 A * | 2/1922 | Genter | ............... | 210/277 |
| 2,296,824 A * | 9/1942 | Ashworth | ............... | 210/793 |
| 2,773,829 A * | 12/1956 | Hunting | ............... | 210/678 |
| 2,851,164 A * | 9/1958 | Morino | ............... | 210/433.1 |
| 3,493,116 A | 2/1970 | Edmiston | | |
| 3,608,725 A | 9/1971 | Oden | | |
| 3,826,375 A * | 7/1974 | Fournier | ............... | 210/291 |
| 4,076,625 A | 2/1978 | Scholten et al. | | |
| 4,191,652 A | 3/1980 | Whitmore | | |
| 4,219,423 A | 8/1980 | Smith | | |
| 4,707,257 A | 11/1987 | Davis et al. | | |
| 5,047,146 A * | 9/1991 | Bastenhof | ............... | 210/97 |
| 5,176,827 A * | 1/1993 | Walter | ............... | 210/274 |
| 5,207,905 A | 5/1993 | O'Brien et al. | | |
| 5,464,543 A | 11/1995 | Moore | | |
| 5,490,924 A * | 2/1996 | Macia et al. | ............... | 210/257.1 |
| 5,792,362 A * | 8/1998 | Ruggles, II | ............... | 210/703 |
| 5,932,092 A * | 8/1999 | Hawk et al. | ............... | 210/167.25 |
| 6,027,645 A | 2/2000 | Biskner et al. | | |
| 6,093,329 A | 7/2000 | McDougald et al. | | |
| 6,287,462 B1 * | 9/2001 | Likos | ............... | 210/167.11 |
| 6,428,690 B1 * | 8/2002 | Tse | ............... | 210/136 |
| 6,709,574 B2 * | 3/2004 | James | ............... | 210/90 |
| 6,773,589 B2 | 8/2004 | Sharkey et al. | | |
| 2004/0238429 A1 * | 12/2004 | Mulvey | ............... | 210/275 |

* cited by examiner

*Primary Examiner* — Joseph Drodge
(74) *Attorney, Agent, or Firm* — J. Wiley Horton

(57) ABSTRACT

An improved filter capable of operating in a backwash mode that creates an upward swirling flow in the hollow interior of the pool filter container. During the backwash cycle, water or air and water are injected into the pool filter container at an angle. In the preferred embodiment, a mixture of water and air are injected into the filter container through exit jets located within the hollow interior of the filter container proximate to the bottom of the filter container. This causes the filter media to swirl upward mixing thoroughly with the backwash water promoting the separation of the mineral deposits from the filter media.

20 Claims, 16 Drawing Sheets

SWIRLING AIR INJECTED POOL FILTER

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of filtration devices for pools. More specifically, the present invention comprises a pool filter having an integrated air injection device configured to inject air into the pool filter causing a swirling motion during the backwash cycle.

2. Description of the Related Art

In most private swimming pools a water pump is used to re-circulate water from the pool through a filter and back to the pool. In most applications, a pressure-fed filter is typically placed in line immediately after the water pump. These filters typically contain filter media such as graded sand or diatomaceous earth. The filter media traps contaminants such as dirt and debris as small as 20 to 40 microns.

FIG. 1 is illustrative of a common sand filter used for a private swimming pool. In normal operating mode, water is pumped from the pool into interior 12 of filter container 10 through normal inlet 16. The water then passes through sand 14 where particulates are trapped and separated from the water. The water passes through intake inlets 40 in laterals 24 and pressure pushes the water through conduit 22 and out normal outlet 20 to recirculate the water back to the pool.

Over time, contaminants collected in sand 14 restrict water flow through sand 14 causing back pressure on the water pump. Thus, pool filtration systems should be "backwashed" routinely to remove the collected contaminants. FIG. 2 illustrates the normal process for backwashing a common sand filter. Water is pumped into filter through normal outlet 20. The water passes through the intake inlets 40 in laterals 24 and through sand 14 toward the top of filter container 10 where it exits through normal inlet 16.

During normal operation of sand filters, channels will form in sand 14 as the passing water finds and exploits paths of least resistance in sand 14. This channeling effect reduces the effectiveness of the filter as the channels enlarge, since contaminants passing through the channels are not collected by the filter. Furthermore, organic materials, calcium and other mineral deposits form within the filter media over time creating "clumps" of filter media which are substantially impermeable to water. When the filter is backwashed, water passes back through the channels and leaves most of the mineral deposits undisturbed. As such, backwashing is currently of limited effectiveness.

It would therefore be desirable to provide an improved filter which is capable of breaking up and separating mineral deposits from the filter media. It would be further desirable to provide an improved filter that is capable of disrupting the structure of the filter media to eliminate channels formed therein.

BRIEF SUMMARY OF THE INVENTION

The present invention is an improved filter capable of operating in a backwash mode that creates an upward swirling flow in the hollow interior of the pool filter container. During the backwash cycle, water or air and water are injected into the pool filter container at an angle. In the preferred embodiment, a mixture of water and air are injected into the filter container through a plurality of exit jets located within the hollow interior of the filter container proximate to the bottom of the filter container. This causes the filter media to swirl upward mixing thoroughly with the backwash water promoting the separation of the mineral deposits from the filter media.

REFERENCE NUMERALS IN THE DRAWINGS

| | | | |
|---|---|---|---|
| 10 | filter container | 12 | interior |
| 14 | sand | 16 | normal inlet |
| 18 | top | 20 | normal outlet |
| 22 | central conduit | 24 | lateral |

-continued

| 26 | water | 28 | conduits |
| 30 | bottom | 32 | distributor |
| 34 | air inlet | 36 | water and sand mixture |
| 38 | side wall | 40 | intake inlets |
| 42 | aspirator | 44 | water pump |
| 46 | air entry | 48 | tube |
| 50 | exit jets | 52 | restricted area |
| 54 | tube | 56 | air inlet |
| 58 | one-way valve | 60 | air and water mixture |
| 62 | air, water and sand mixture | 64 | air and water mixture |
| 66 | pore valve | 68 | air compressor |
| 70 | conduit entry | 72 | manifold |
| 74 | conduits | 76 | distributor |
| 78 | conduit entry | | |

DETAILED DESCRIPTION OF THE INVENTION

Figure 1:
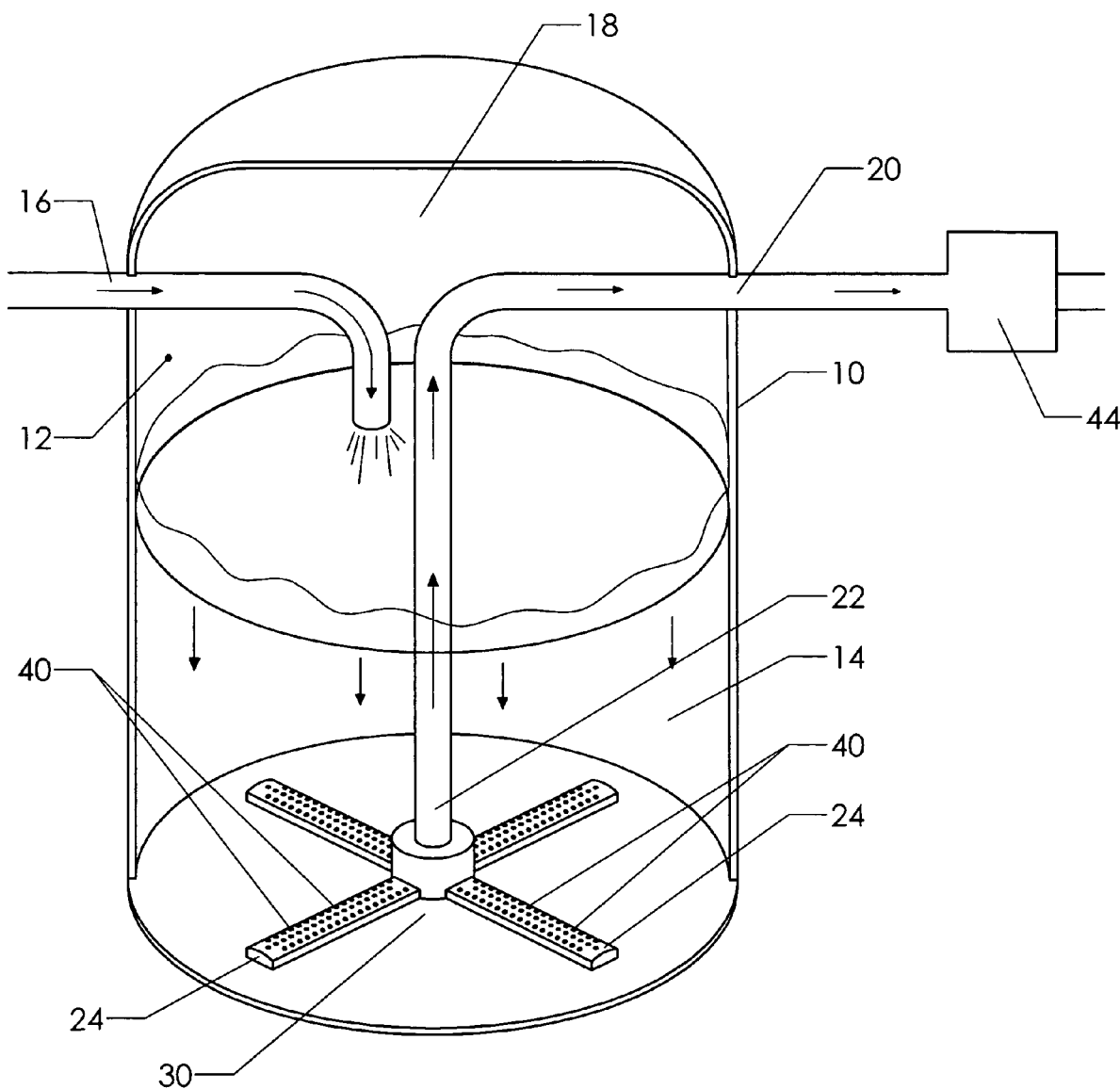
FIG. 1 is a perspective view, illustrating a prior art pool filter, with the front wall stripped away.
Figure 2:
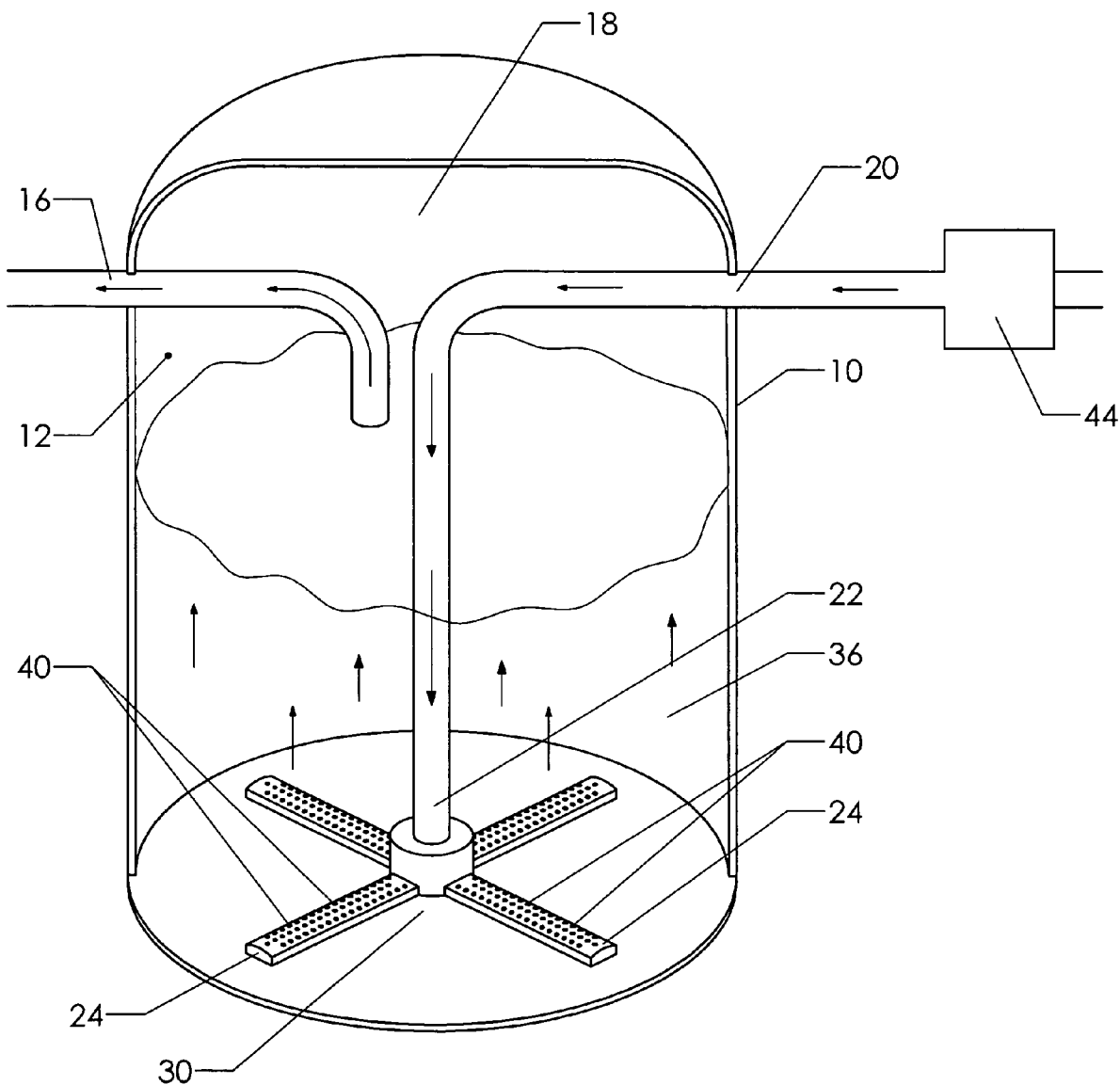
FIG. 2 is a perspective view, illustrating a prior art pool filter operating in a backwash cycle, with the front wall stripped away.
Figure 3:
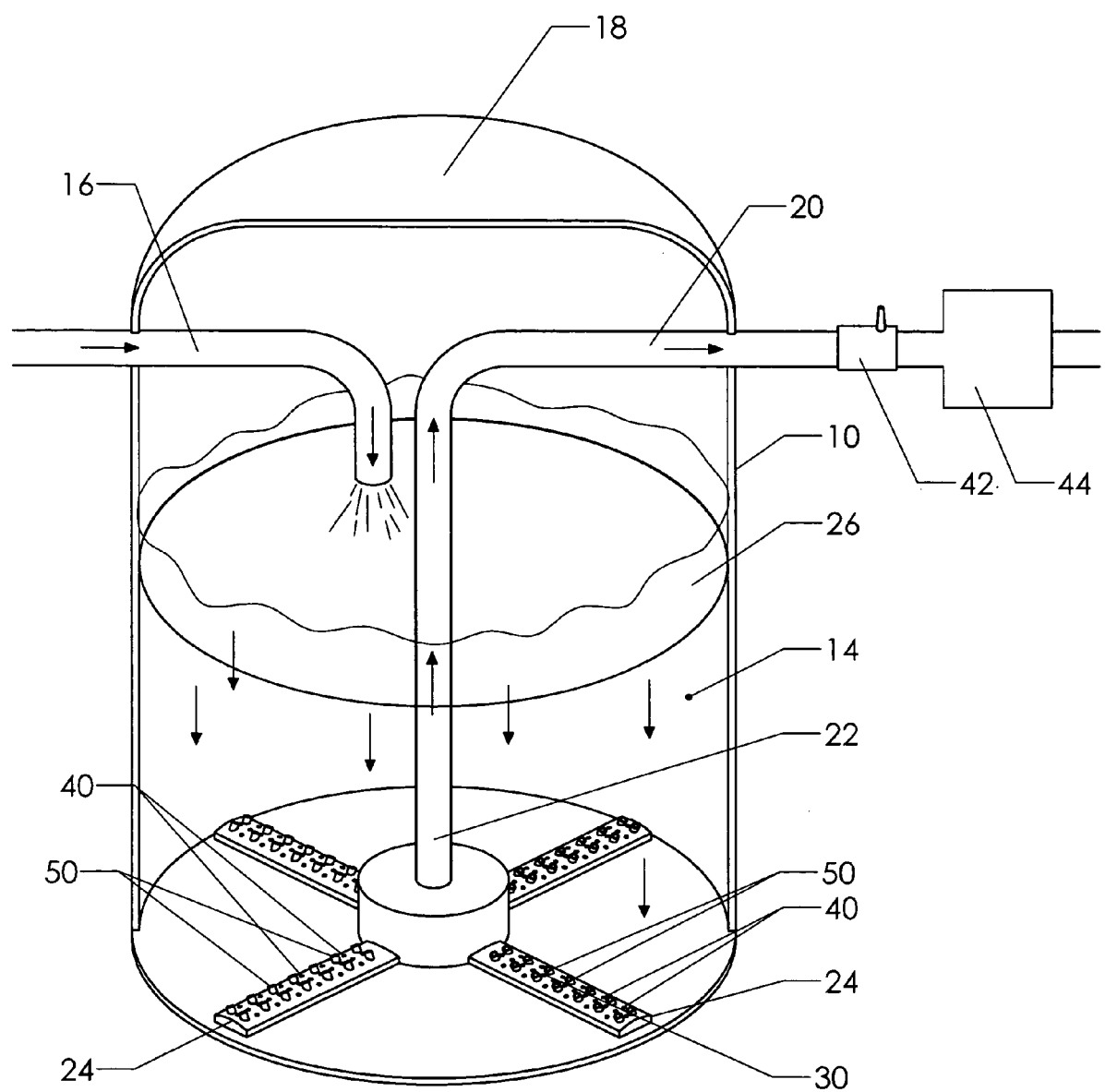
FIG. 3 is a perspective view, illustrating the preferred embodiment of the present invention, with the front wall stripped away.

FIG. 3 illustrates the present invention, an improved pool filter, in the preferred embodiment. The improved filter includes many features common to the standard pool filters including normal inlet 16, normal pool outlet 20, water pump 44 and conduit 22. The improved filter also includes prior art laterals 24 which are buried under sand 14. In addition to features found in standard pool filters, the preferred embodiment of the present invention includes aspirator 42 connected in sequence with water pump 44 and a plurality of exit jets 50 fluidly connected to each lateral 24. Each exit jets 50 is approximately 30-45 degrees offset from the top of lateral 24. In normal operating mode, or filtration mode, the present invention operates very similarly to the prior art filtration shown in FIG. 1. Water enters from the pool through normal inlet 16. Water 26 slowly filters down through sand 14, where particulates are trapped and separated from the water. The water passes through intake inlets 40 in laterals 24 and pressure pushes the water through conduit 22 and out normal outlet 20 to recirculate the water back to the pool.

Figure 4:
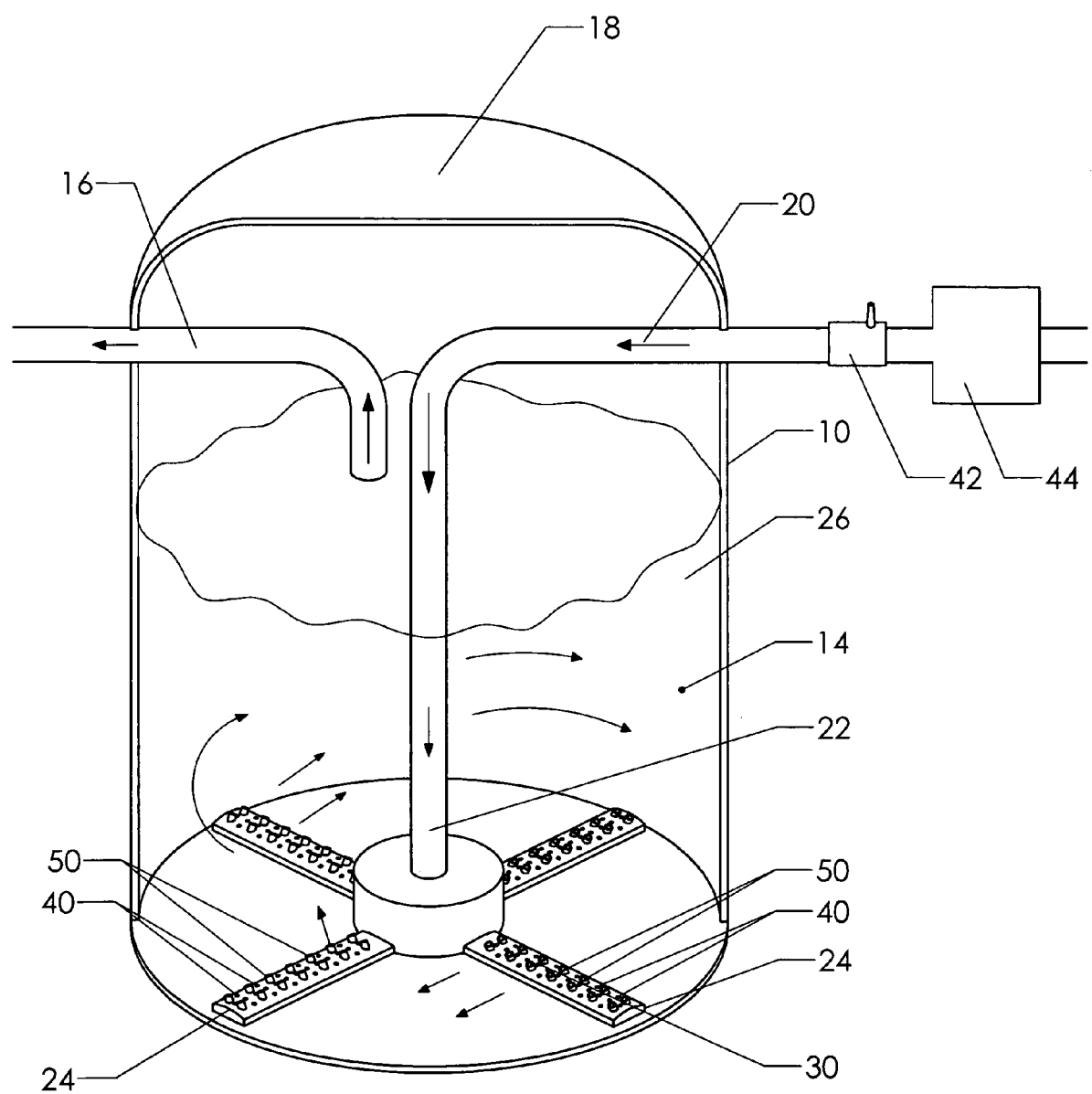
FIG. 4 is a perspective view, illustrating the preferred embodiment of the present invention operating in a backwash cycle, with the front wall stripped away.

During backwash mode, as shown in FIG. 4, the present invention operates to loosen and disrupt the sand particles by injecting air along with water into the interior 12 of the filter container 10 while forcing the air, sand and water mixture 62 to swirl around central conduit 22. In the preferred embodiment air is injected into normal outlet 20 by way of aspirator 42. When water pump 44 is turned on in backwash mode, water moves through aspirator 42 where air is taken in. The air and water mixture travels down central conduit 22 to laterals 24. The air and water mixture flows through laterals 24 and out exit jets 50. Because exit jets 50 are angularly offset from laterals 24 the air, sand and water mixture 62 begins to swirl. The cyclonic effect created by injecting the air and water mixture at a 30-45 degree angle offset from the top of lateral 24 enables the optimal separation between sand particles and at a quick rate. Injecting air causes trapped clumps to float upward, where agitation brakes them up.

Figure 5:
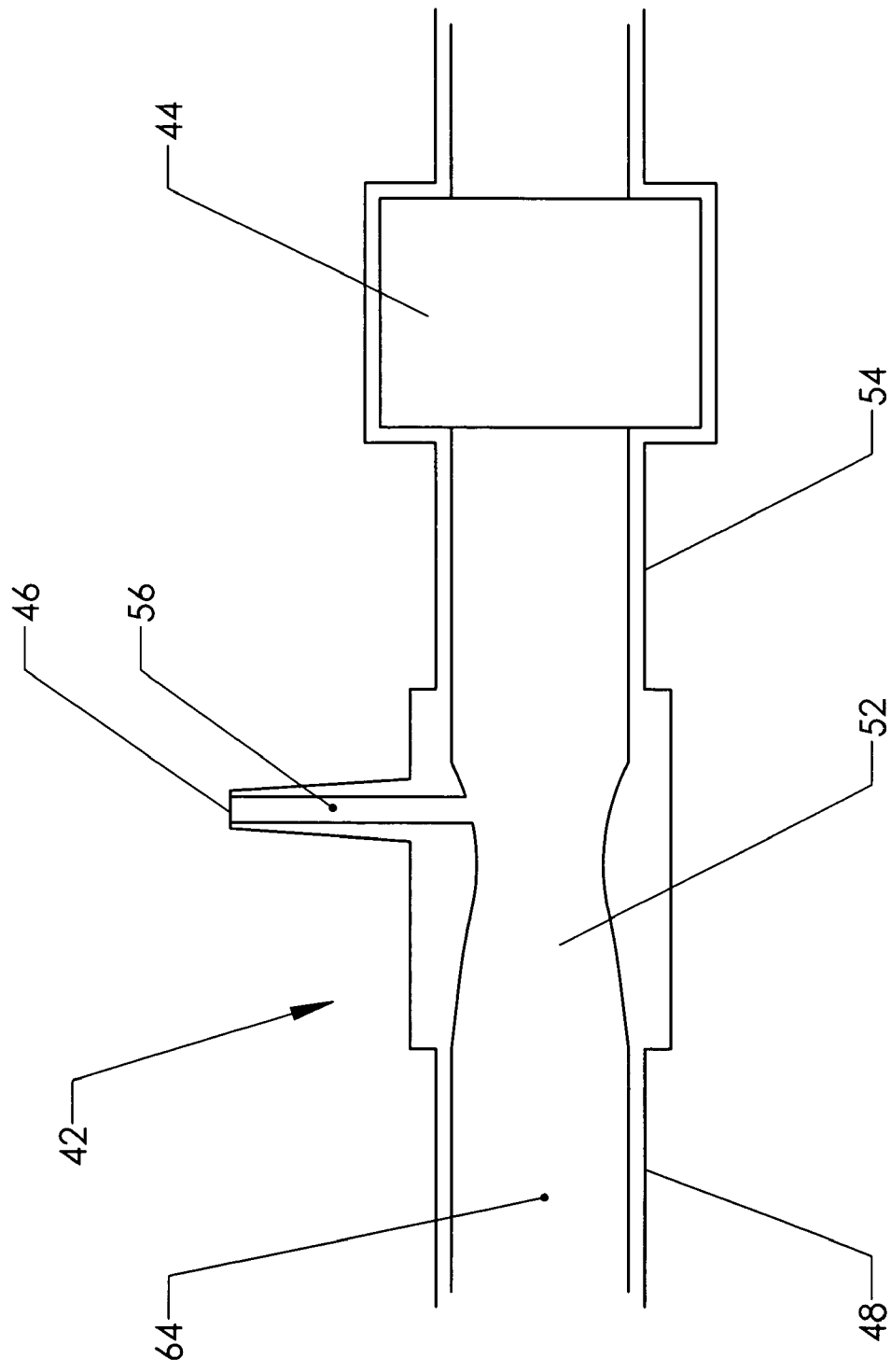
FIG. 5 is a sectioned view, illustrating the entry point of the water and air in the preferred embodiment of the present invention.

FIG. 5 is a cross section view illustrating the operation of air entry in the present invention. Water pump 44 pumps water through tube 54 to aspirator 42 where tube 54 narrows to restricted area 52. When tube 54 narrows to restricted area 52 the velocity of the water in tube 54 increases causing the pressure in tube 54 to decrease. The decrease in water pressure in tube 54 causes the air to flow in through air inlet 56 thereby combining with water in restricted area 52. The air and water mixture 64 flows through normal outlet 20 and continues into central conduit 22 as seen in FIG. 4. As an alternative an air compressor (not shown) could be used instead of aspirator 42. This would create the same effect of mixing air and water and could be positioned in the same area as the current aspirator 42.

Figure 6:
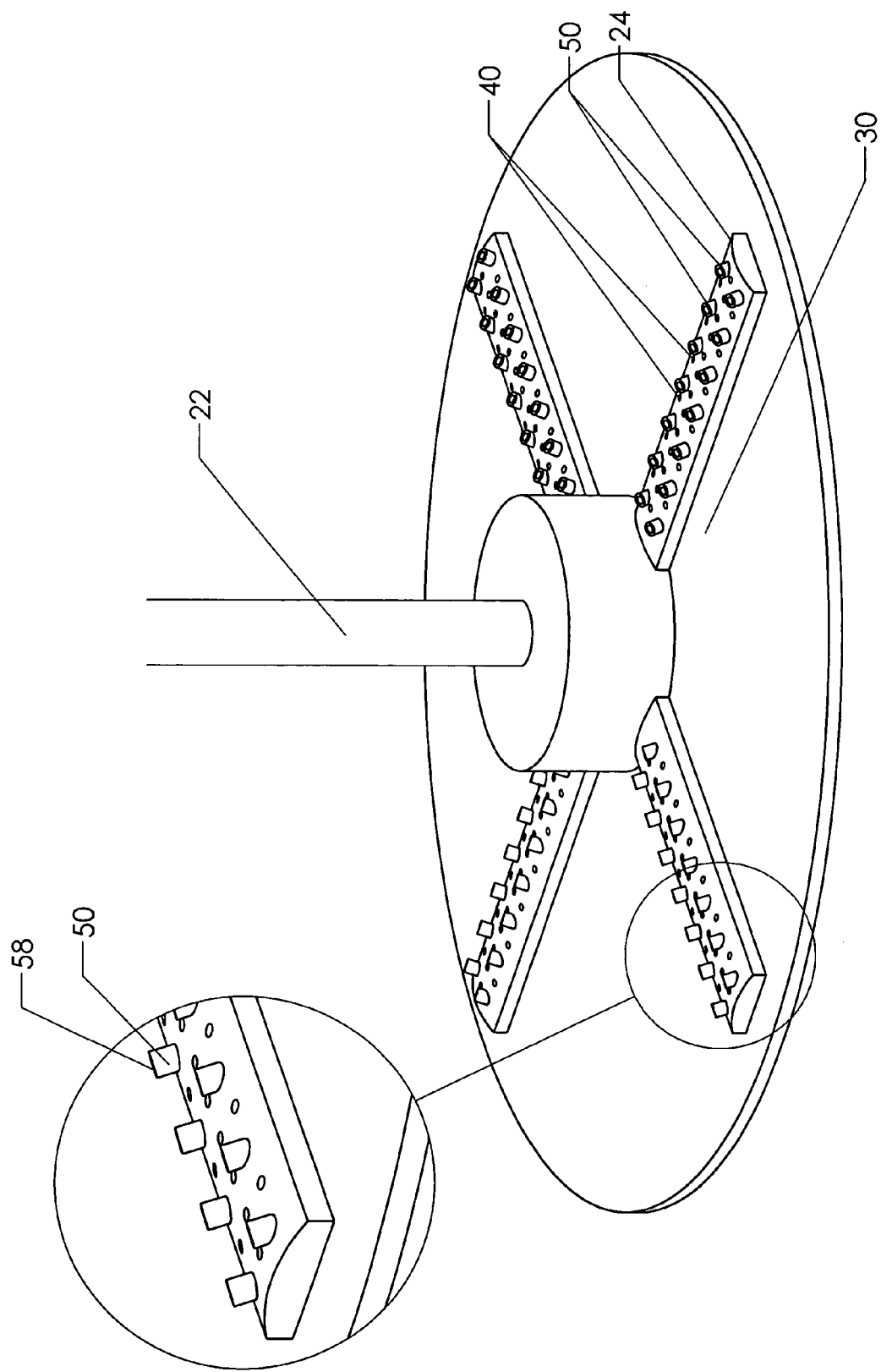
FIG. 6 is a perspective view, illustrating the bottom of the present invention including the laterals.
Figure 7:
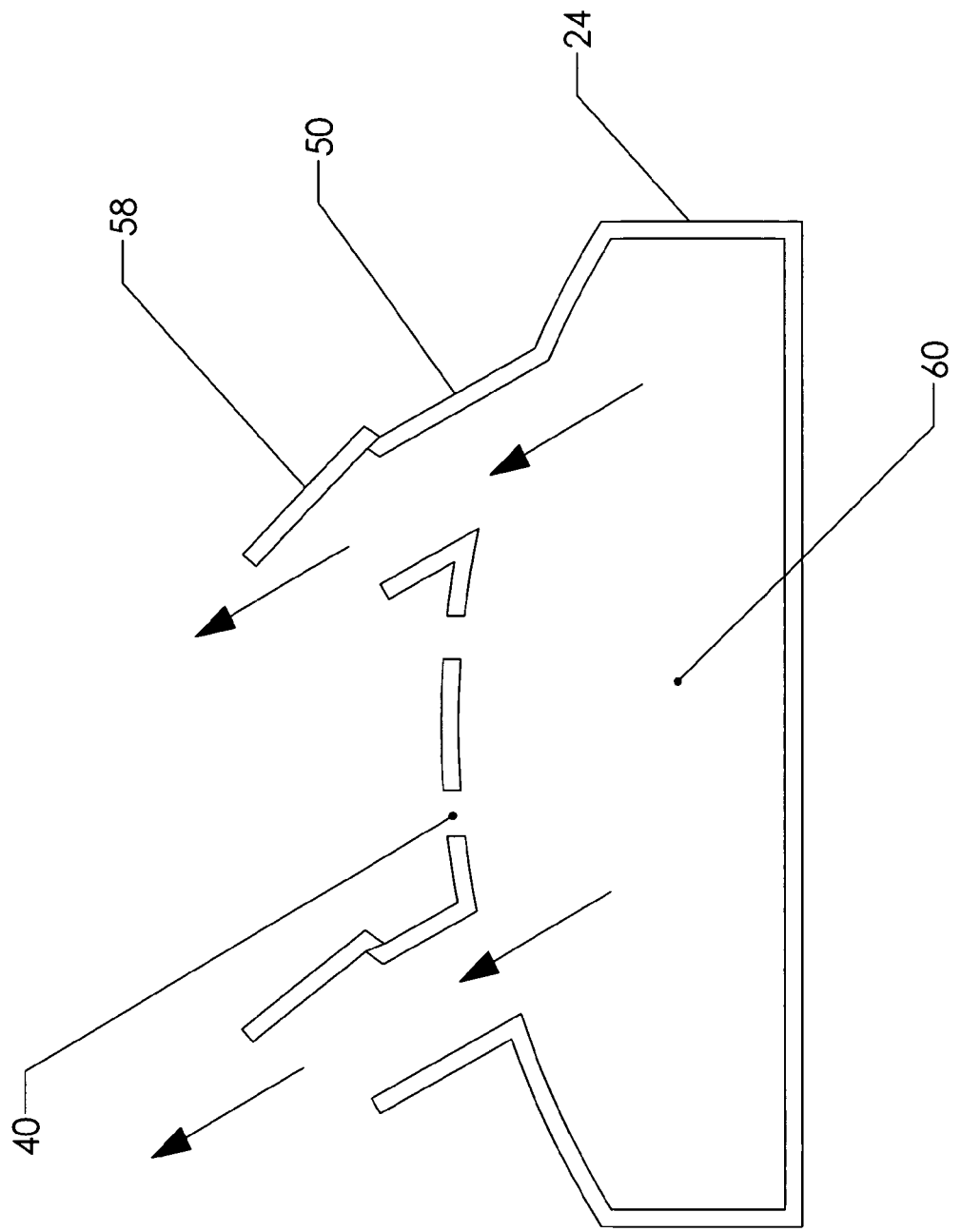
FIG. 7 is a sectioned view, illustrating a cross-section of the width of one of the laterals of the present invention.

A perspective view of four laterals 24 in the preferred embodiment of the present invention, with an expanded view of one section of a lateral 24, is shown in FIG. 6. During backwash mode the air and water mixture flows down central conduit 22 to each lateral 24. Each lateral 24 has a plurality of intake inlets 40 and a plurality of exit jets 50 with one-way valves 58. Each exit jet 50 is approximately 45 degrees offset from lateral 24. FIG. 7 shows a cross-section of the width of lateral 24. When air and water mixture 60 flows through lateral 24 and into exit jet 50 the mixture forces open one-way valve 58 causing the mixture of air and water to shoot out at an angle. As seen in FIG. 4, the angular force created by the exiting mixture causes the air, water and sand mixture 62 to swirl. This cyclonic motion combined with injecting the water and air mixture into the sand is ideal for completely breaking apart the sand.

In the alternative, central conduit 22 could be divided into a first central conduit and a second central conduit. During backwash mode a first central conduit could allow water to flow to a first set of laterals and out exit jets 50. A one way valve located on first central conduit would allow water to flow through first central conduit during backwash mode but not in normal mode. During normal mode water could filter through filter media to intake inlets 40, through a second set of laterals and up through second central conduit to normal outlet. A one way valve located on second central conduit would allow water to flow through second central conduit during normal mode but not in backwash mode, preventing water from entering pool during backwash.

Figure 8:
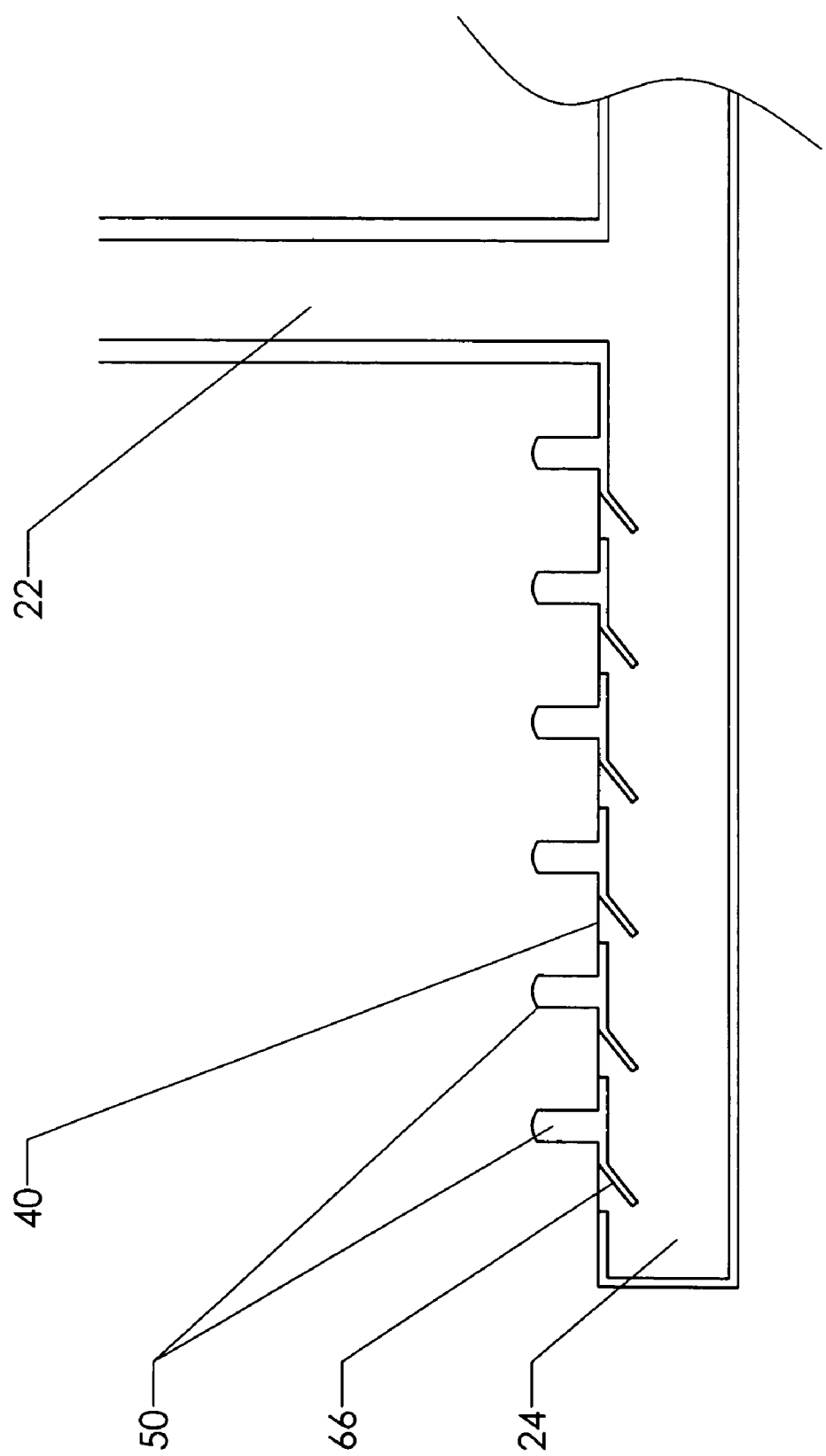
FIG. 8 is a sectioned view, illustrating a cross-section of the length of one of the laterals of the present invention.

In the preferred embodiment of the present invention the plurality of intake inlets 40 could be designed to either allow or disallow the air and water mixture to escape during backwash mode. The plurality of intake inlets 40 could be designed such that intake inlets 40 are small enough that the water pressure remains strong enough to force open one-way valves 58 on exit jets 50, as shown in FIG. 7. In the alternative as illustrated in a lengthwise cross-section of lateral 24, FIG. 8, when air and water mixture flows down through central conduit 22 and into lateral 24, the mixture forces valves 66 on intake inlets 40 to close, while redirecting water through exit jets 50.

Figure 9:
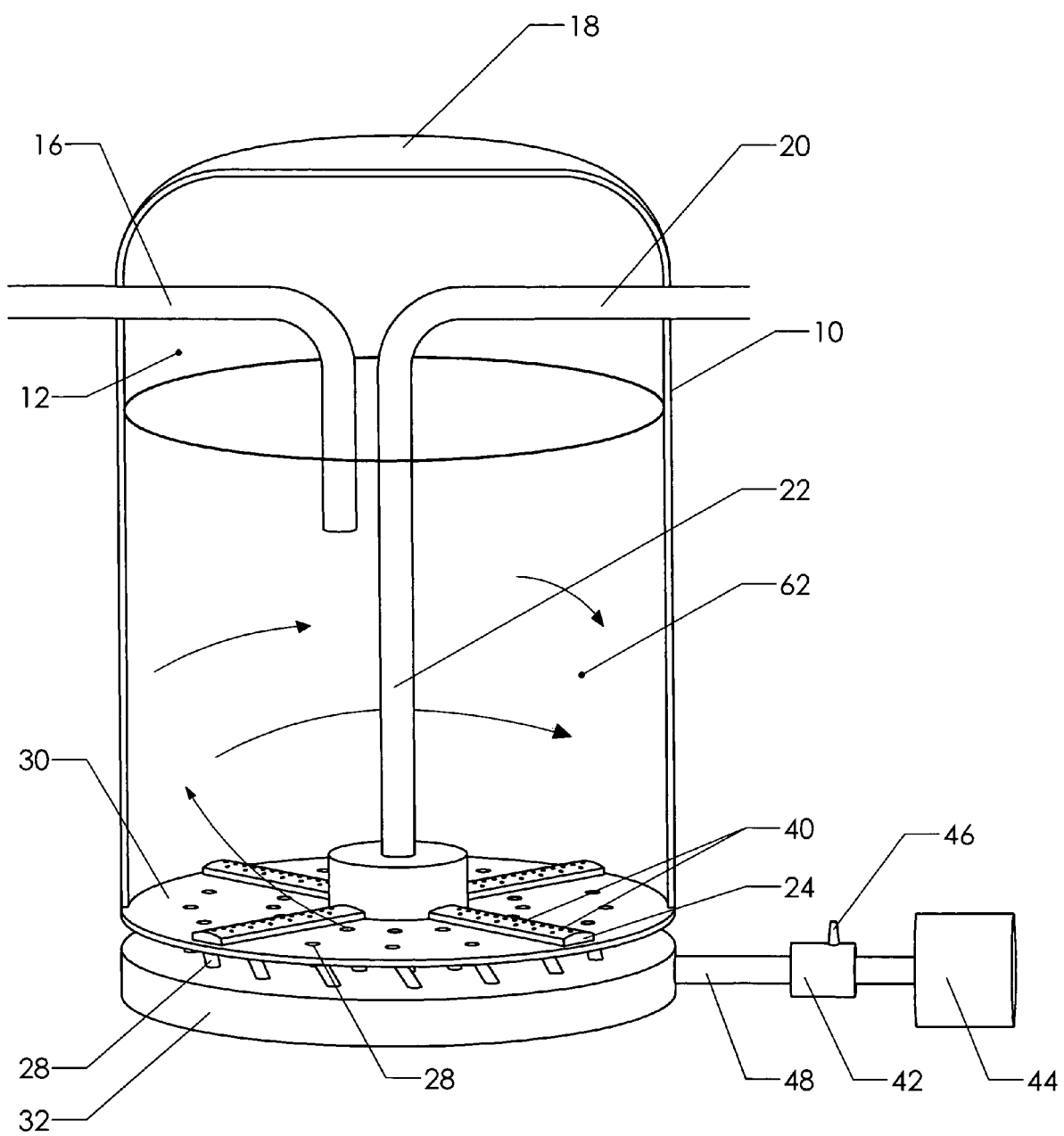
FIG. 9 is a perspective view, illustrating an alternate embodiment of the present invention with the front wall stripped away.

FIG. 9 shows an alternate embodiment of the present invention. The alternate embodiment still includes normal inlet 16, normal pool outlet 20, central conduit 22 and laterals 24 which are buried under sand 14. In the alternate embodiment of the present invention a plurality of conduits 28 are fluidly connected with filter container 10 at bottom 30. Conduits 28 are also fluidly connected to distributor 32 which can be fed air and water from water pump 44 and aspirator 42 or air compressor (not shown). In normal filtration mode, the alternate embodiment operates in the same manner as a standard pool filter.

In backwash mode, as seen in FIG. 9, water is no longer run through normal inlet 16 and normal outlet 20. Instead water pump 44 forces water through aspirator 42 where air enters through air entry 46. This process is nearly identical to the detailed illustration and description for FIG. 5, showing and describing the operation of air intake. The air and water mixture then flows through entry tube 48 and into distributor 32, where the mixture travels through conduits 28 and into filter container 10. Conduits 28 are fluidly connected to distributor 32. Conduits 28 are also fluidly connected with and angled with respect to bottom 30 of filter container 10 to create a cyclonic flow of air, water and sand mixture 62 within filter container 10. This cyclonic flow pattern causes the filter media to mix thoroughly with the air and water thereby promoting the separation of the mineral deposits from the filter media. The water then passes through sand 14 and is then evacuated from filter container 10 out normal inlet 16. Because the filter media is denser than the water and contaminants, the concentration of the filter media is higher at the bottom of filter container 10 than at the top. Thus, only trace amounts of the filter media are evacuated from filter container 10 through normal inlet 16 when operating in the backwash mode.

Figure 11:
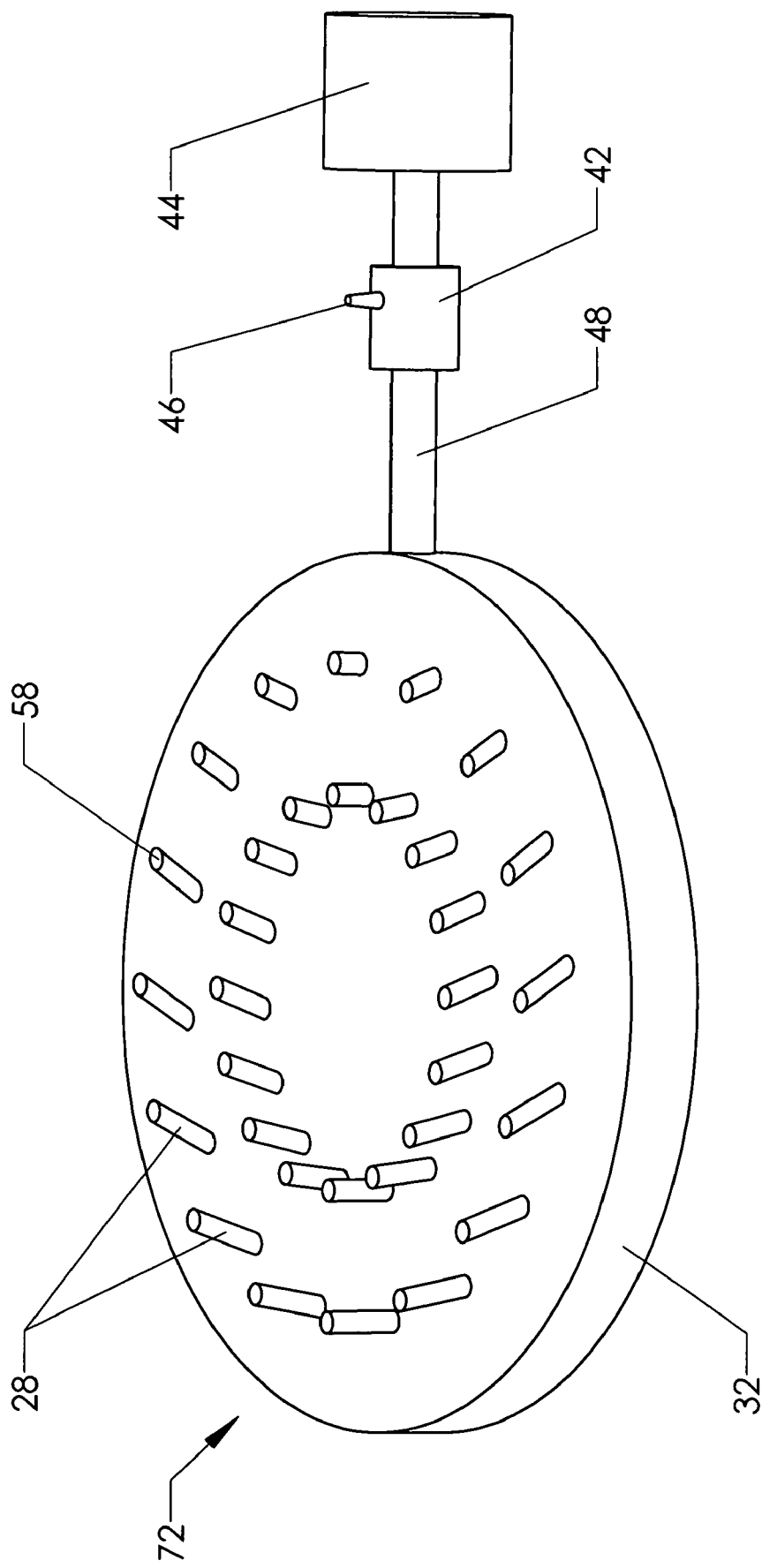
FIG. 11 is a perspective view, illustrating the injector manifold of the alternate embodiment of the present invention.

The angular displacement of conduits 28 can be better seen in FIG. 11, which illustrates the entire injector manifold 72, generally comprised of water pump 44, aspirator 46, distributor 32 and conduits 28. Distributor 32 is shown as a flat circular disc; however, distributor 32 could be shaped in any manner which would allow air and water to pass from tube 48 to distributor 32 to conduits 28. Additionally, it may be necessary to support conduits 28 such that they do not deform under the weight of filter container (not shown).

Figure 10:
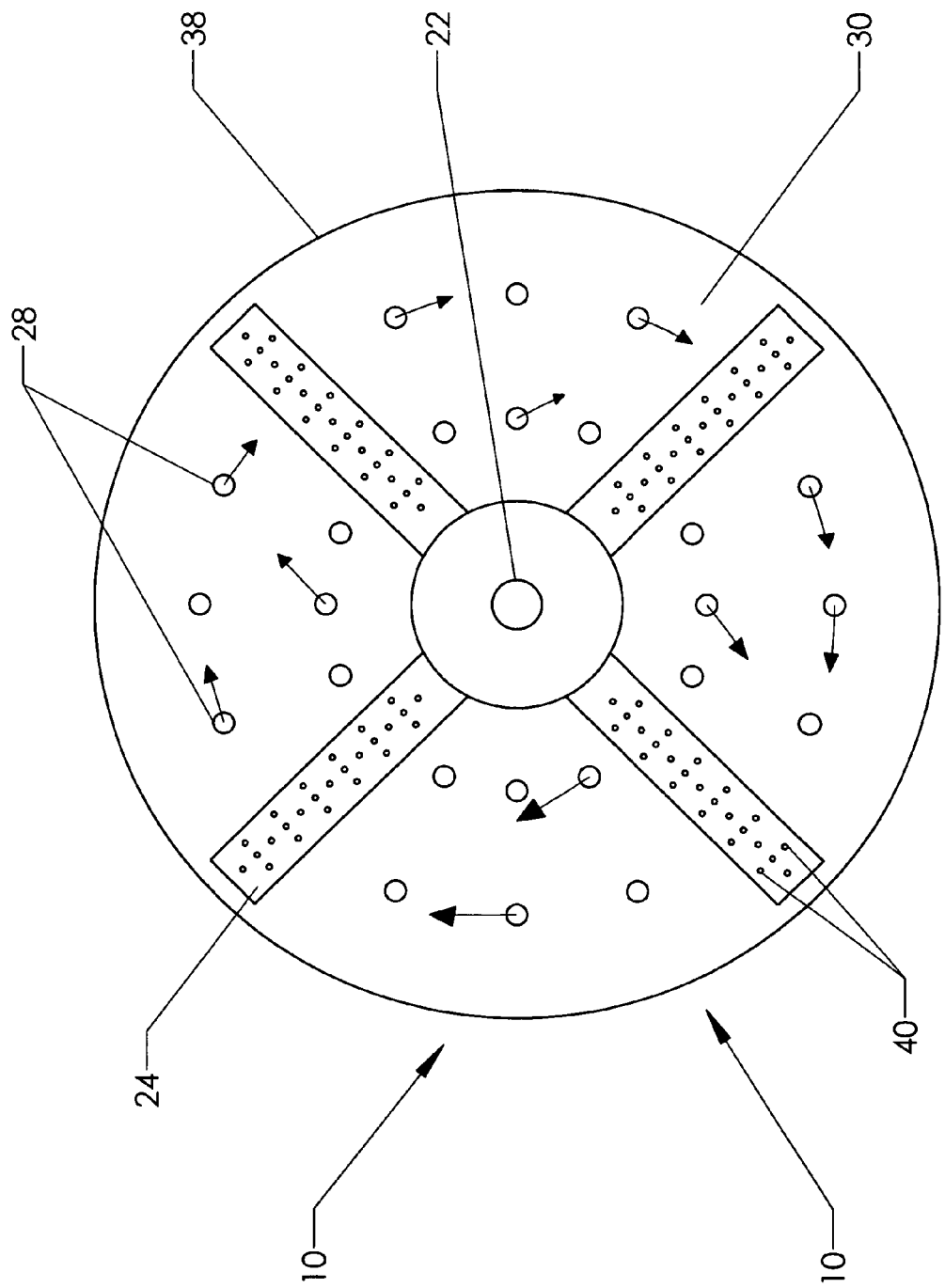
FIG. 10 is a sectioned top view, showing an alternate embodiment of the present invention.
Figure 12:
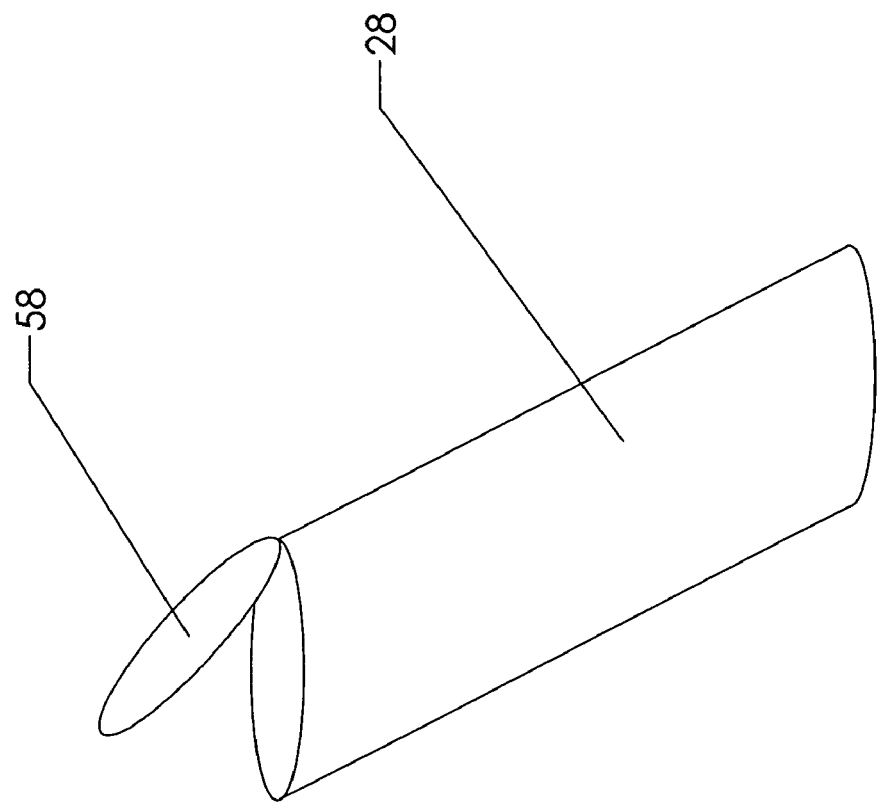
FIG. 12 is a perspective view, showing a conduit of the present invention.

FIG. 10 shows the interior of filter container 10 from above. Conduits 28 are fluidly connected with bottom 30 of filter container 10 as shown. A mesh filter (not illustrated) or one-way valve 58, as shown in FIG. 12, can be used to prevent filter media from passing through conduits 28 when operating in conventional filtration mode. One-way valve 58 is hinged to conduit 28 to allow water and air mixture out of conduit 28 but keep filter media out of conduits 28. When operating in backwash mode, the air and water mixture is injected into bottom 30 at angle that is approximately perpendicular from the internal diameter of filter container 10 (as indicated by the arrows in FIG. 10). This injection angle produces a cyclonic effect by causing the filter media and the air and water mixture to flow in angular direction about the center axis of filter container 10 and central conduit 22.

Figure 13:
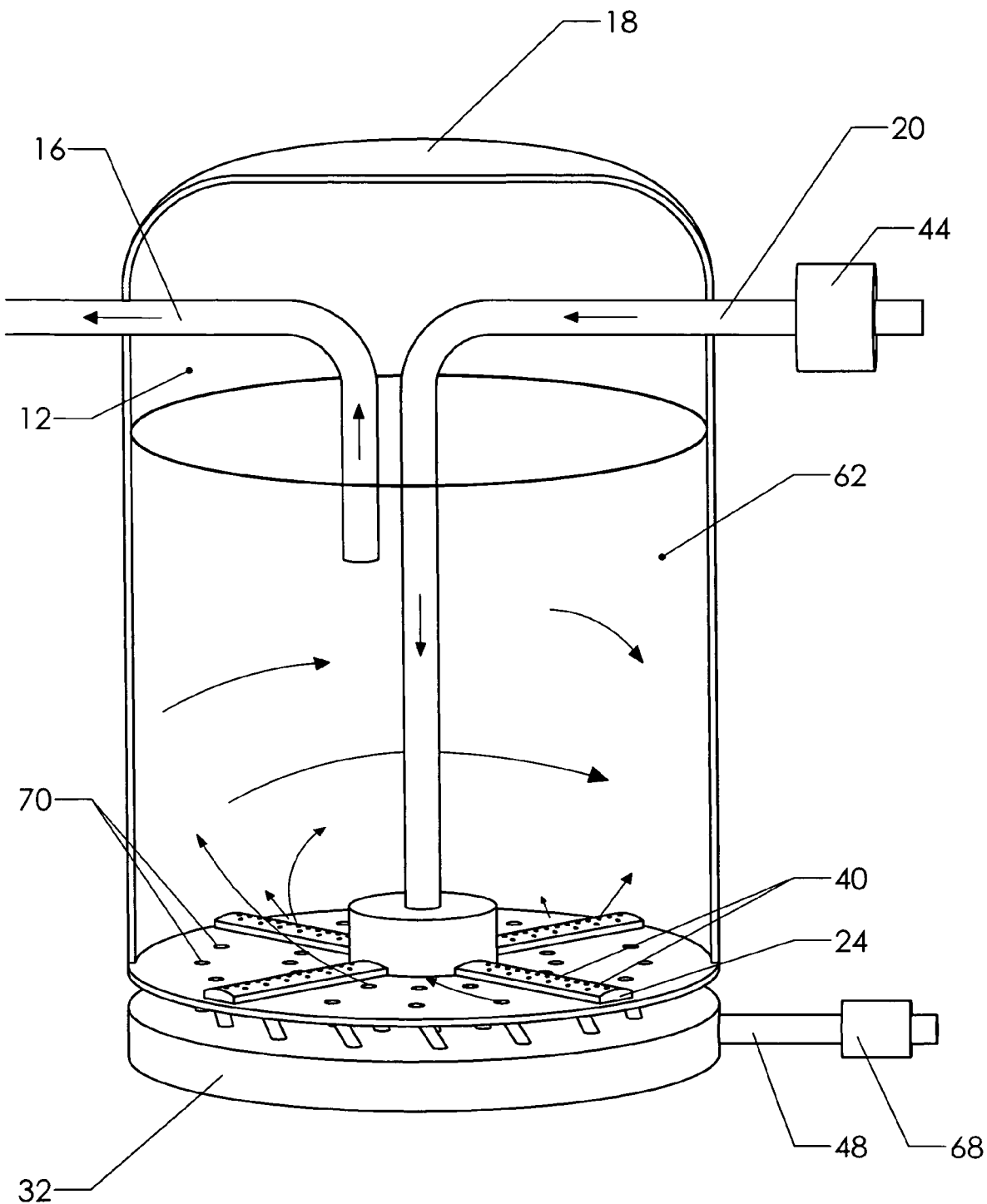
FIG. 13 is a perspective view, showing an alternate embodiment of the present invention with the front wall stripped away.

Yet another embodiment of the present invention is shown in FIG. 13. This embodiment is substantially similar to the alternate embodiment described herein and shown in FIG. 9. The presently described embodiment operates in the same manner as the previously described embodiment when in filtration mode. However, when in backwash mode the presently described embodiment does pump water via water pump 44 down into laterals 24 and out of a plurality of intake inlets 40. The water comes out of intake inlets 40 in an upward direction (as illustrated by arrows in FIG. 13), just as it would in a prior art filter. Additionally, while in backwash mode, air is injected through conduit entry 70 in a similar manner as water and air are injected in the previously described embodiment. The air is pressurized by air compressor 68 attached to entry tube 48. Upon entry into filter container 10 the air and water mix with sand to create a swirling air, water and sand mixture 62.

Figure 14:
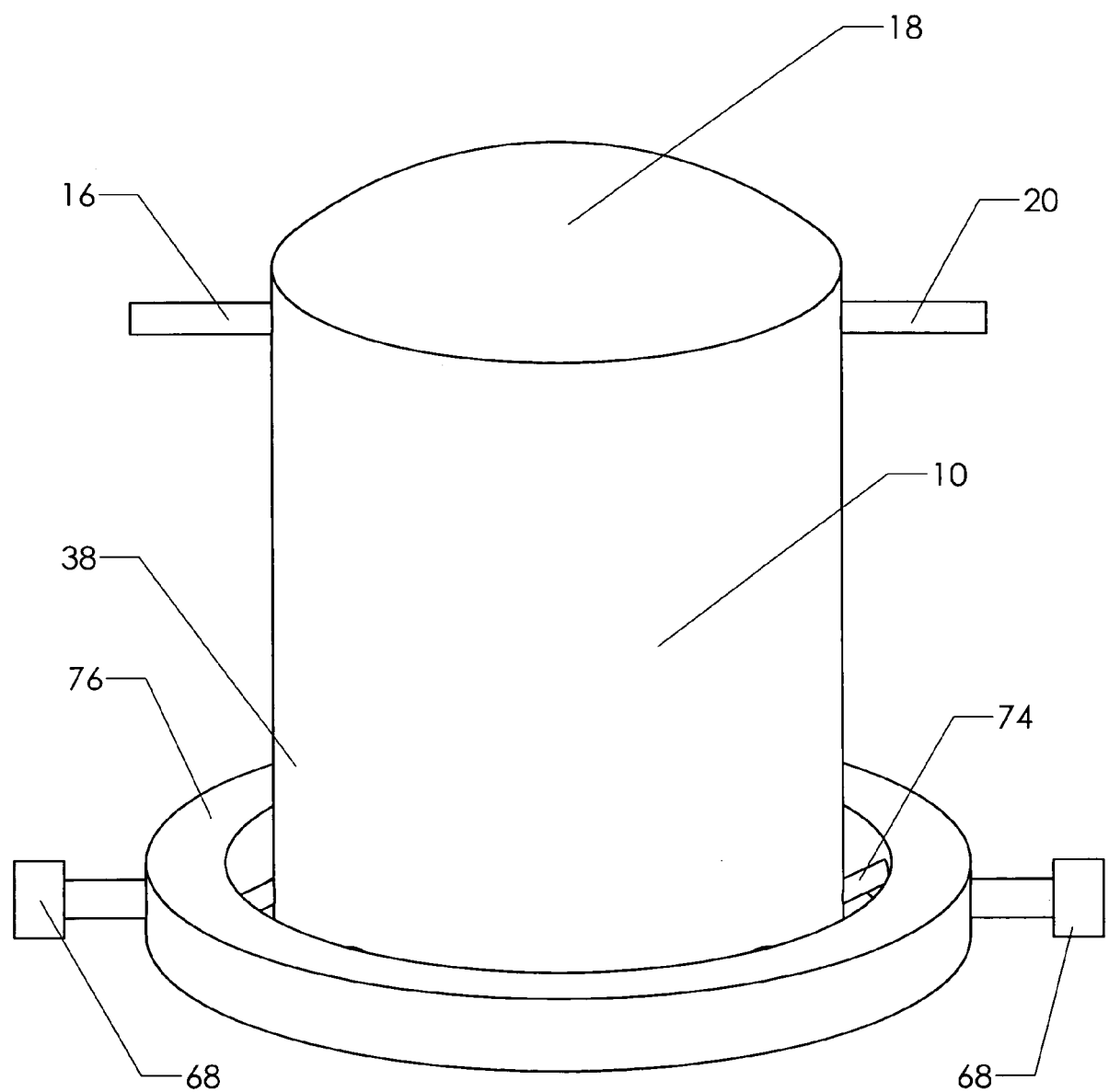
FIG. 14 is a perspective view, showing an alternate embodiment of the present invention.

FIG. 14 illustrates another embodiment of the present invention. In this embodiment air is injected into filter container 10 through conduits 74 which are in fluid communication with the interior of filter container 10 through side wall 38. The distributor 76 wraps around the lower sidewall 38 of filter container 10. The distributor 76 can be fed by one or more air compressors 68.

Figure 16:
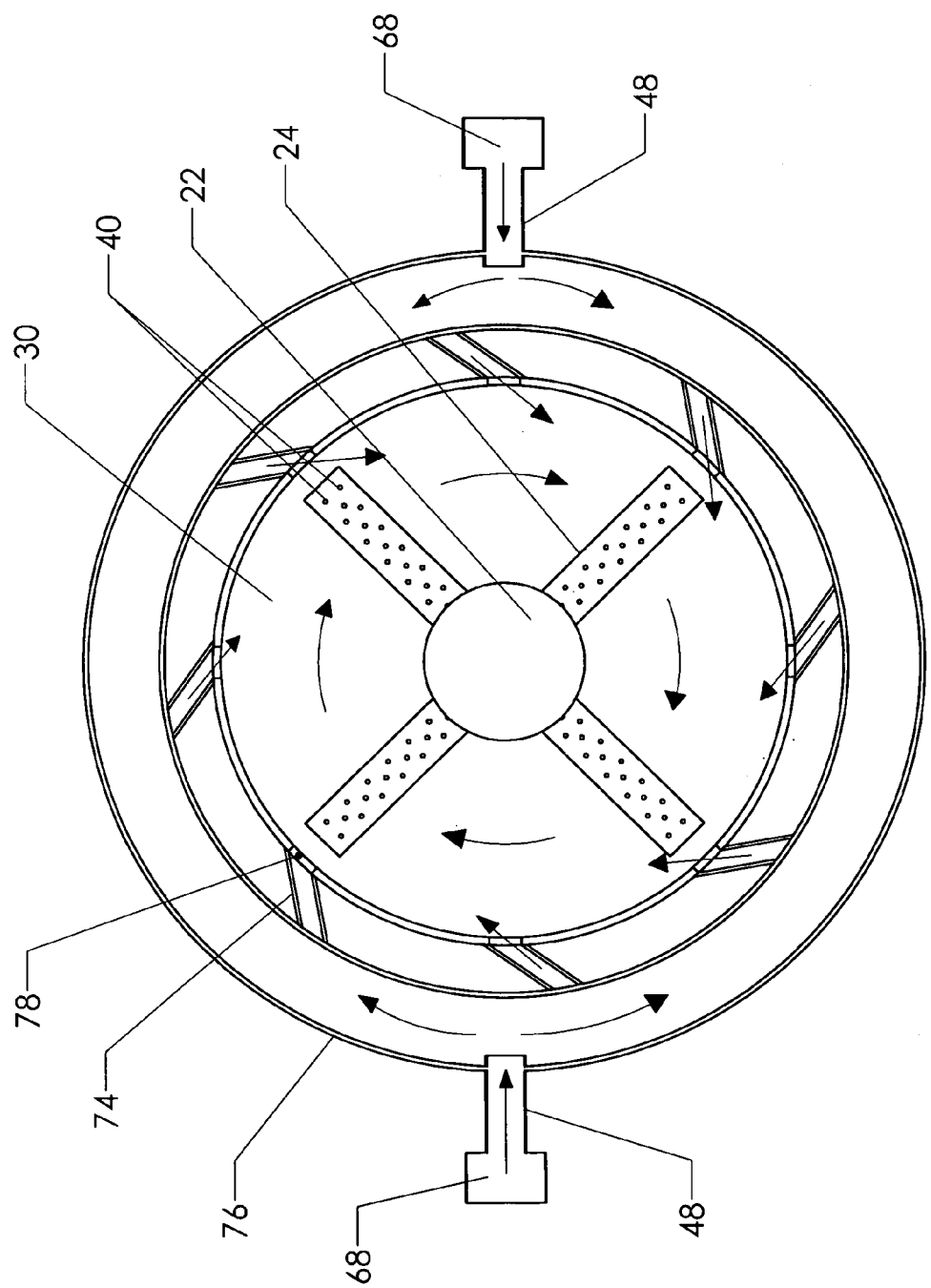
FIG. 16 is a sectioned top view, showing an alternate embodiment of the present invention.

As illustrated in FIG. 16, similar to the embodiment of FIG. 10, the air is injected at angle that is substantially perpendicular to the internal diameter of filter container 10 (as indicated by the arrows traveling through each conduit 74 in FIG. 16). Similar to the embodiment of FIG. 10, this injection angle produces a cyclonic effect by causing the filter media and backwash water flow in angular direction about the center axis of filter container 10 and conduit 22. The reader will appreciate that the distributor 76 could also be fed by an air and water mixture.

Figure 15:
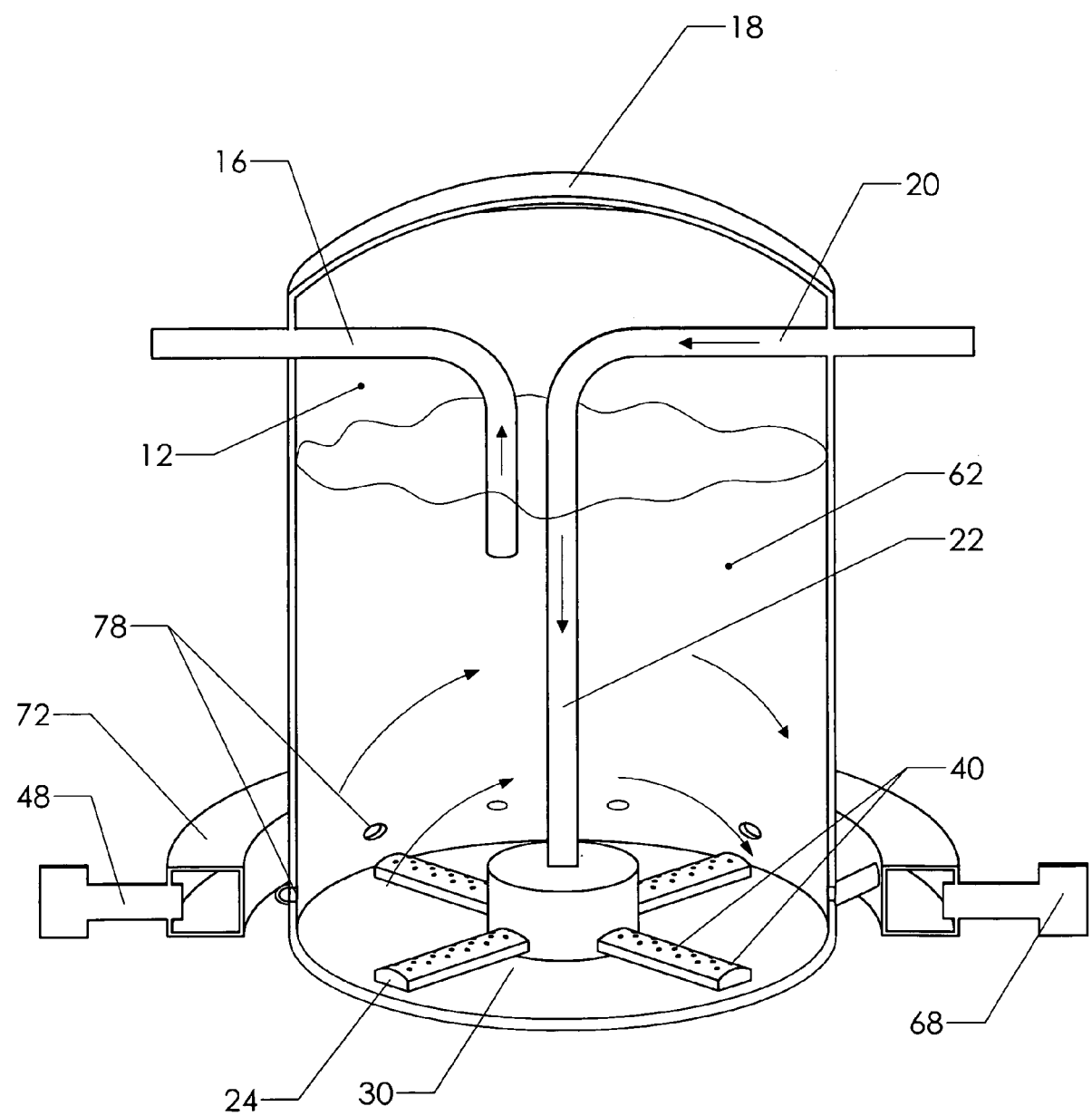
FIG. 15 is a perspective view, showing an alternate embodiment of the present invention with the front wall stripped away.

Additionally, FIG. 15 shows a perspective view of the internal operation of the presently described embodiment. As the air or air and water mixture enter through conduit entry 78 via distributor 76 the filter media is forced to swirl around central conduit 22, breaking apart the sand and dislodging debris.

It should be noted that the improved filter of the present invention may be operated in discrete stages or cycles when backwashing. For example, the improved filter may be first subjected to a "conventional" backwash cycle where backwash water is fed through normal outlet 20 and out normal inlet 16. After operating in conventional backwash mode, air may be injected through the air conduits to create the cyclonic effect. During this enhanced backwash mode, additional water may be circulated through the filter. Alternatively, air may be circulated through the filter without feeding additional water through normal outlet 20. Thus, the improved filter is capable of operating in two different types of backwash modes: (1) water feed only; (2) air feed only; and (3) combined water feed and air feed. In some cases it may be desirable to subject the improved filter to each backwash mode in alternating succession.

For filtration systems designed to operate in multiple backwash modes, a simple control system may be used to activate the water pump and air compressor at designated times for designated time intervals. For example, the control system may activate the water pump and air compressor according to the following schedule:

(1) operate water pump alone for 5 minutes for conventional backwash cycle;

(2) operate air compressor and water pump simultaneously for 5 minutes; and (3) operate water pump alone for 5 minutes for another conventional backwash cycle.

The foregoing schedule is exemplary of how the present invention may be used. Obviously, other durations and cycle pattern variations may be employed. Furthermore, the preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A pool filter capable of operating in a normal mode and in a backwash mode, comprising:
   a. a filter container having a hollow interior and a bottom;
   b. said hollow interior being configured to receive a volume of filter media;
   c. a plurality of intake inlets located within said hollow interior proximate said bottom;
   d. wherein when said pool filter is operating in said normal mode and when said volume of filter media is in position, said plurality of intake inlets draw in water through said filter media;
   e. a plurality of exit jets located within said hollow interior proximate said bottom;
   f. wherein when said pool filter is operating in said backwash mode, said plurality of exit jets expel water upward through said filter media;
   g. wherein each of said plurality of exit jets is tilted off of vertical such that said plurality of exit jets acting in unison, when said pool filter is operating in said backwash mode, create a swirling flow within said hollow interior and i. the filter container comprising a plurality of laterals, the surface of said laterals containing said inlets and connecting to said exit jets separately from said inlets.

2. The pool filter of claim 1, wherein said pool filter further comprises a central conduit that fluidly connects with a plurality of said laterals.

3. The pool filter of claim 1, wherein said pool filter further comprises a first central conduit and a second central conduit, wherein said first central conduit fluidly connects with a plurality of first laterals and wherein said second central conduit fluidly connects with a plurality of second laterals.

4. The pool filter of claim 3, wherein said first central conduit further comprises a one-way valve allowing water to flow through said plurality of first laterals when said pool filter is operating in said backwash mode but not in said normal mode.

5. The pool filter of claim 4, wherein said second central conduit further comprises a one-way valve allowing water to flow through said plurality of second laterals when said pool filter is operating in said normal mode but not in said backwash mode.

6. The pool filter of claim 1, wherein each of said plurality of exit jets further comprises a one-way valve allowing water to flow through said exit jet when pool filter is operating in said backwash mode but not in said normal mode.

7. The pool filter of claim 1, wherein each of said plurality of intake inlets further comprises a one-way valve allowing water to flow through said intake inlets when pool filter is operating in said normal mode but not in said backwash mode.

8. The pool filter of claim 1, further comprising a normal inlet configured to feed a quantity of water into said interior of said filter container when operating in normal mode.

9. The pool filter of claim 8, further comprising a normal outlet configured to evacuate said quantity of water from said interior of said filter container after said quantity of water has passed through said filter media when operating in said filtration mode.

10. The pool filter of claim 8, wherein said normal inlet further comprises a venturi pump configured to allow a quantity of air into said normal inlet to combine with said quantity of water.

11. The pool filter of claim 8, wherein said normal inlet further comprises an air compressor configured to inject a quantity of air into said normal inlet to combine with said quantity of water.

12. A pool filter capable of operating in a normal mode and in a backwash mode, comprising:
   a. a filter container having a hollow interior and a bottom;
   b. said hollow interior being configured to receive a volume of filter media;
   c. a plurality of intake inlets located within said hollow interior proximate said bottom;
   d. wherein when said pool filter is operating in said normal mode and when said volume of filter media is in position, said plurality of intake inlets draw in water through said filter media;
   e. an injector manifold located proximate said bottom;
   f. wherein said injector manifold has a plurality of conduits configured to fluidly connect with said bottom of said filter;
   g. wherein when said pool filter is operating in said backwash mode, said plurality of conduits expel a fluid upward through said filter media;
   h. wherein each of said plurality of conduits is tilted off of vertical such that said plurality of conduits acting in unison, when said pool filter is operating in said backwash mode, create a swirling flow within said hollow interior and
   i. the filter container comprising a plurality of laterals, the surface of said laterals containing said inlets and connecting to said conduits separately from said inlets.

13. The pool filter of claim 12, wherein said injector manifold further comprises an air compressor configured to inject a quantity of air into said plurality of conduits so that said fluid is a mixture of water and air.

14. The pool filter of claim 13, wherein said quantity of air allows said filter media to float upwards.

15. The pool filter of claim 13, wherein when said pool filter is operating in said backwash mode, said plurality of intake inlets expel a quantity of water upward through said filter media mixing with said quantity of air and said filter media.

16. The pool filter of claim 13, wherein said injector manifold further comprises a water pump.

17. The pool filter of claim 12, wherein said injector manifold further comprises a water pump and a venturi pump.

18. The pool filter of claim 17, wherein said fluid is a mixture of water and air.

19. The pool filter of claim 12, wherein said injector manifold further comprises a water pump.

20. The pool filter of claim 19, wherein said fluid is a quantity of water.

* * * * *